UNITED STATES PATENT OFFICE.

CHARLES C. HALL, OF ALEXANDRIA, INDIANA.

INSULATING MATERIAL.

No. 811,778.     Specification of Letters Patent.     Patented Feb. 6, 1906.

Application filed May 11, 1905. Serial No. 259,994.

*To all whom it may concern:*

Be it known that I, CHARLES C. HALL, a citizen of the United States, residing at Alexandria, in the county of Madison and State of Indiana, have invented a new and useful Insulating Material, of which the following is a specification.

This invention relates to insulating material.

The object of the invention is in a ready, cheap, and thoroughly practical manner to render either sheet-asbestos or mineral wool absolutely waterproof, whereby when employed as an insulator or lagging for cold-storage buildings, packing-houses, breweries, ice plants, refrigerators, and the like it will be absolutely proof against absorption of moisture, thereby in an appreciable manner increasing the refrigerating properties of such buildings by conserving the ice or other refrigerant and measurably reducing the expense incident to maintaining such buildings or inclosures at the desired degree of temperature.

With the above and other objects in view, as will appear as the nature of the invention is better understood, the same consists in the novel insulating material, as will be hereinafter fully described and claimed.

In carrying the invention into effect there is taken any desired quantity of divided or comminuted asbestos or mineral wool of commerce, preferably about ninety-two per cent., by weight, of the entire bulk of the substance to be made, to which is added about eight per cent., by weight, of a suitable binder—such as ground wood-pulp or paper-stock, starch, flour, glue, or any other suitable adhesive or gum or sodium silicate—and the mass is then thoroughly mixed in any suitable manner and formed into blocks, slabs, or boards of any desired size and form. The proportion of the binder to the asbestos herein stated has been found best adapted for the purposes defined, for the reason that by adding only a comparatively small proportion of the binder to the asbestos the fireproof qualities of the latter will not be detracted from, while there will be sufficient of the binder to render the article stable and perfectly adapted to the uses to which it will be put. After drying, the product thus formed is saturated with a suitable waterproofing material, which may be composed of paraffin-wax, stearin, tallow, or asphaltum dissolved in a suitable solvent—such as naphtha, gasolene, benzin, bisulfid of carbon—in the proportion of one pound, more or less, of paraffin or the like and two and one-half gallons, more or less, of the solvent. The treated asbestos or mineral wool is allowed to become thoroughly saturated with the fluid, after which it is immediately placed in an air-tight chamber, and the solvent is removed by a vacuum-pump and is then condensed in any suitable manner. By saving the solvent, which is the most expensive ingredient employed, the production of the material is reduced to a minimum, and the solvent that is saved may be reused a large number of times by merely adding thereto the quantity lost by evaporation while the material is being saturated. After the material is thoroughly dry it is removed from the chamber and is then ready for use. The product resulting from this procedure is compact and thoroughly moisture-proof, will float indefinitely upon water, and will not deteriorate with age. The treatment causes the wax or the like to permeate and coat the cells and interstices of the molded asbestos or mineral wool, so that from core to surface it is rendered absolutely waterproof.

The proportions of the ingredients stated are those that have been found thoroughly effective in use; but it is to be understood that the invention is not to be limited thereto, as they may be varied or changed under certain conditions and still be within the scope of the invention.

Having thus described the invention, what is claimed is—

An insulating material consisting of a commixture of asbestos and ground wood-pulp in the proportion of ninety-two per cent. of asbestos and eight per cent. of wood-pulp, and an oleaginous substance with which the compound is permeated throughout.

In testimony that I claim the foregoing as my own I have hereto affixed my signature in the presence of two witnesses.

CHARLES C. HALL.

Witnesses:
   B. H. BALL,
   JNO. MCKEE.